United States Patent
Kuznetsov

(10) Patent No.: US 9,396,389 B2
(45) Date of Patent: Jul. 19, 2016

(54) TECHNIQUES FOR DETECTING USER-ENTERED CHECK MARKS

(71) Applicant: ABBYY Development LLC, Moscow (RU)

(72) Inventor: Sergey Anatolyevich Kuznetsov, Moscow Region (RU)

(73) Assignee: ABBYY Development LLC (RU)

( * ) Notice: Subject to any disclaimer, the term of this patent is extended or adjusted under 35 U.S.C. 154(b) by 0 days.

(21) Appl. No.: 14/509,188

(22) Filed: Oct. 8, 2014

(65) Prior Publication Data

US 2015/0379339 A1 Dec. 31, 2015

(30) Foreign Application Priority Data

Jun. 25, 2014 (RU) ................................ 2014125722

(51) Int. Cl.
*G06K 9/46* (2006.01)
*G06K 9/00* (2006.01)
*G06K 9/60* (2006.01)

(52) U.S. Cl.
CPC .............. *G06K 9/00456* (2013.01); *G06K 9/60* (2013.01)

(58) Field of Classification Search
USPC ......... 382/170, 171, 190, 274, 275; 358/3.26, 358/3.27, 537, 538
See application file for complete search history.

(56) References Cited

U.S. PATENT DOCUMENTS

| | | | |
|---|---|---|---|
| 6,970,267 B1 | 11/2005 | Scanlon et al. | |
| 7,257,256 B2 | 8/2007 | Tunney et al. | |
| 7,552,381 B2 | 6/2009 | Barrus et al. | |
| 7,564,587 B2 | 7/2009 | Scanlon et al. | |
| 7,593,605 B2 * | 9/2009 | King ................ | H04N 1/00244 382/229 |
| 7,812,860 B2 * | 10/2010 | King ................ | G06F 17/30011 348/210.99 |
| 8,077,930 B2 * | 12/2011 | Hauke ............... | G06K 9/00288 382/115 |
| 8,321,126 B2 * | 11/2012 | Mays ................ | G01C 21/36 340/995.19 |
| 8,418,055 B2 * | 4/2013 | King ................ | G06F 17/211 707/711 |
| 8,447,066 B2 * | 5/2013 | King ................ | G06K 9/228 382/100 |
| 8,542,411 B2 | 9/2013 | Sisco et al. | |
| 8,620,058 B2 * | 12/2013 | Nepomniachtchi ...... | G06K 9/36 382/137 |
| 8,638,363 B2 * | 1/2014 | King ................ | G06F 17/211 340/937 |
| 8,694,881 B2 * | 4/2014 | Alderucci ........... | G06F 3/0481 715/229 |
| 2005/0022124 A1 | 1/2005 | Tunney et al. | |

* cited by examiner

*Primary Examiner* — Yosef Kassa
(74) *Attorney, Agent, or Firm* — LeighAnn Weiland; Veronica Weinstein

(57) ABSTRACT

A digital camera associated with a mobile processing apparatus is used to produce a file containing a 2D digitized image of a document having pre-formatted fields for user's check marks. The image is electronically matched to a digital template of the document for extracting digitized images of the pre-formatted fields, which are thereafter analyzed for presence therein of user-entered check marks.

22 Claims, 6 Drawing Sheets

TECHNIQUES FOR DETECTING USER-ENTERED CHECK MARKS

CROSS REFERENCE TO RELATED APPLICATIONS

The application claims the benefit of priority to Russian Patent Application No. 2014125722, filed Jun. 25, 2014; the disclosure of which is incorporated herein by reference.

FIELD OF THE INVENTION

The present disclosure relates to the field of data capture and document processing using optical character recognition (OCR) and intelligent character recognition (ICR).

BACKGROUND OF THE INVENTION

OCR/ICR techniques are generally used for transforming images of paper documents in computer readable and editable formats, as well as for extracting data from the documents. Typically, OCR/ICR-enabled devices perform computerized scanning of the documents and machine analysis of obtained scans (i.e., scan files of the documents).

However, data capture document processing applications such as on-site/real-time analysis of documents having pre-formatted fields for user's check marks (e.g., forms, check-lists, questionnaires, etc.) may require more expeditious processing than could be provided by using traditional OCR/ICR techniques.

SUMMARY OF THE INVENTION

Techniques for using a mobile processing apparatus for processing check marks in documents having pre-formatted fields for entering the check marks are disclosed.

In one embodiment, a digital camera associated with the mobile processing apparatus is used to produce a file containing a 2D digitized image of such a document. Then, identifiers helping to distinguish one document from another and markers identifying location and orientation of portions containing the pre-formatted fields are used to produce a file wherein the 2D digitized image is modified to match orientation and size of a digital template of the document.

Using the template, digitized images of the pre-formatted fields are electronically extracted and analyzed for presence therein of user-entered check marks. Presence of the check marks is detected by subtracting background pixels and determining if a number of remaining pixels exceeds a first pre-selected threshold, or determining if a ratio of non-background pixels to all pixels exceeds a second pre-selected threshold.

Various other aspects and embodiments of the disclosure are described in further detail below. It has been contemplated that features of one embodiment of the disclosure may be incorporated in other embodiments thereof without further recitation.

The Summary is neither intended nor should be construed as being representative of the full extent and scope of the present disclosure. All objects, features and advantages of the present disclosure will become apparent in the following detailed written description and in conjunction with the accompanying drawings.

The novel features believed being characteristic of the description are set forth in the appended claims.

Figure 1:
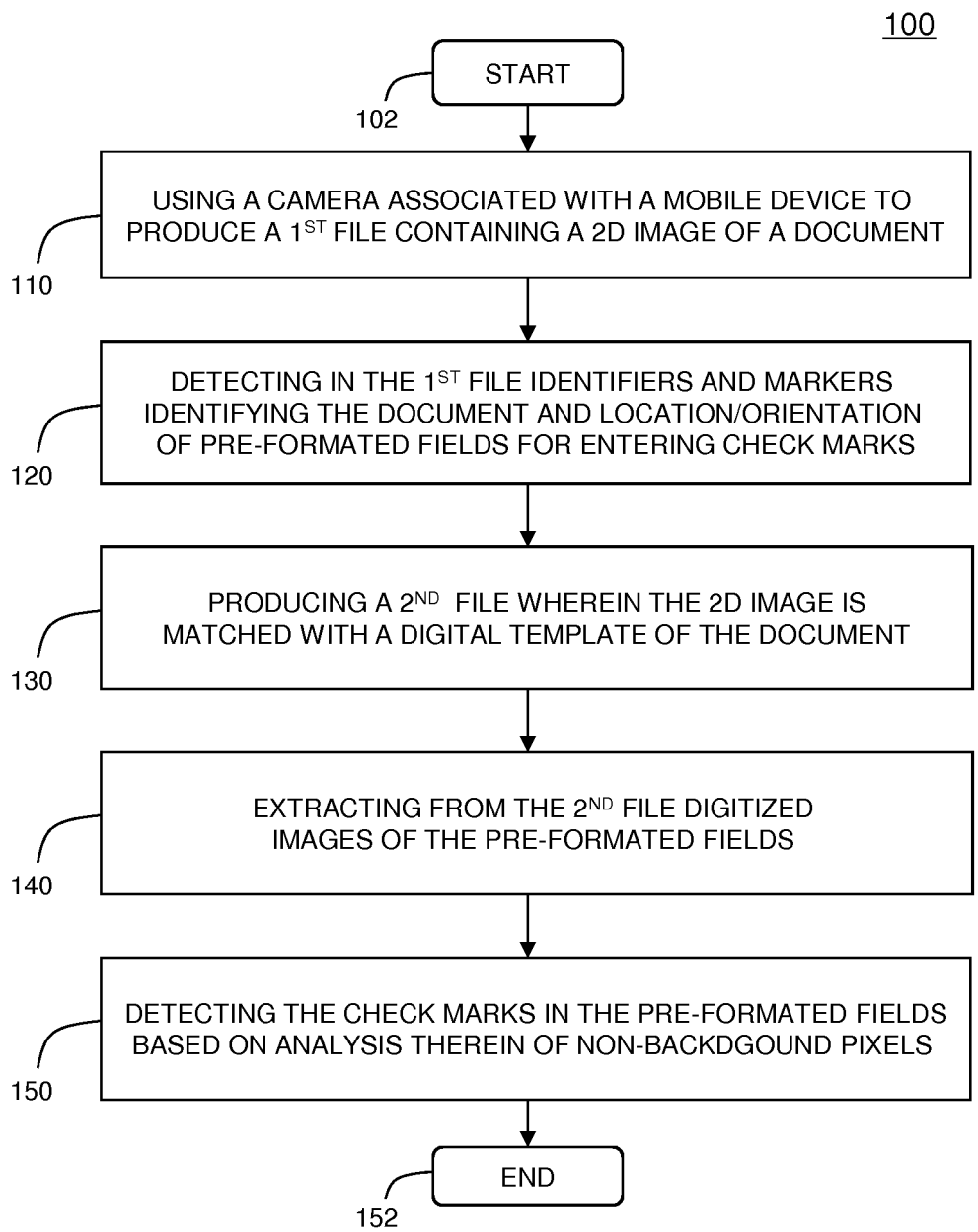
FIG. 1 depicts a diagram illustrating a method of using a mobile processing apparatus to process check marks in a document having pre-formatted fields for entering the check marks according to one embodiment of the present disclosure.

The images in the drawings are simplified for illustrative purposes and are not depicted to scale.

To facilitate understanding, identical reference numerals are used in the drawings to designate, where possible, substantially identical elements that are common to the figures, except that alphanumerical extensions and/or suffixes may be added, when appropriate, to differentiate such elements.

DETAILED DESCRIPTION OF THE INVENTION

Objects, features and advantages of the present disclosure are discussed below in reference to mobile processing apparatuses using associated thereto digital cameras to process check marks in documents having pre-formatted fields for entering the check marks. It has been contemplated that at least portions of the present disclosure may also be utilized using other types of processing apparatuses (e.g., desktop computers associated with stand-alone or built-in digital cameras) or for analysis of other types of documents (e.g., computer graphics, shooting targets, etc.) or digitized images thereof.

Figure 2:
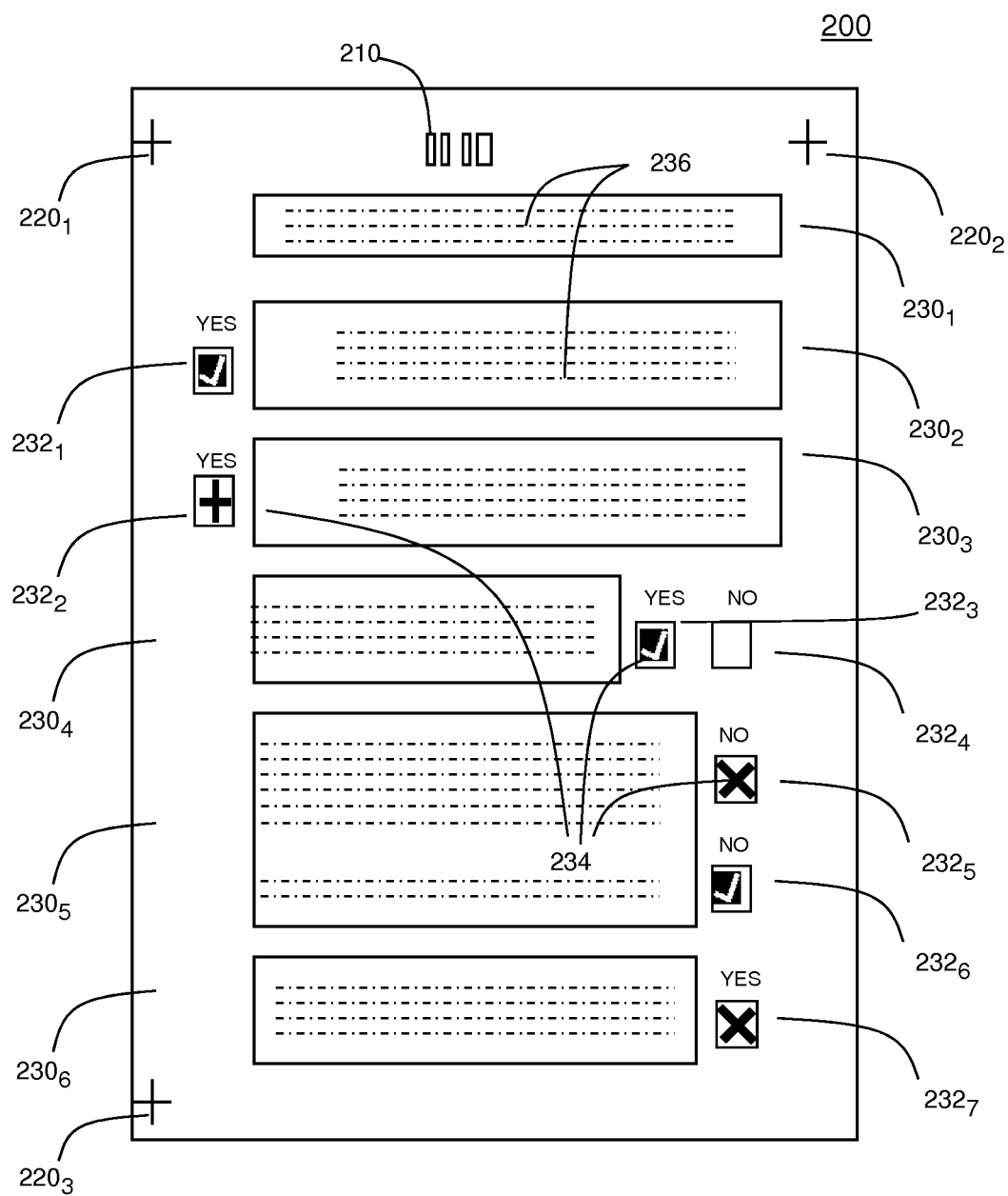
FIG. 2 depicts an exemplary document having pre-formatted fields for entering the check marks and used herein for illustrating the method of FIG. 1.

FIG. 1 depicts a diagram illustrating a method 100 of using a mobile processing apparatus to process check marks in a document having pre-formatted fields for entering the check marks according to one embodiment of the present disclosure, and FIG. 2 depicts an exemplary document 200 having the pre-formatted fields and used herein for illustrating the method of FIG. 1. For best understanding of the disclosure, it is recommended to refer to FIGS. 1 and 2 simultaneously.

The method 100 starts at step 102 and proceeds to step 110.

At step 110, using a digital camera built-in or otherwise associated with (e.g., communicatively coupled to) a mobile processing apparatus is taken a snapshot of a document having pre-formatted fields for entering the user's check marks after the document have been executed (i.e., the check marks have been entered) by a user of the document. Examples of suitable mobile processing apparatus include, but not limited to, a mobile phone, a mobile computing device (e.g., tablet computer, personal digital assistant (PDA) or laptop computer), and an Internet-enabled digital camera, In memory of the mobile processing apparatus or associated thereto digital camera, the snapshot is saved in a form of a processor-readable digital file of the photographed document. This file is referred to herein as a "$1^{st}$ file".

Generally, the $1^{st}$ file contains a 2D digitized image of the photographed document and may also include a partial image of an article(s) surrounding or supporting the document (e.g., table where the document is photographed, and the like). For brevity, hereafter any processor-readable digital file(s) is/are referred to as "file(s)".

In one embodiment, a file containing a blank (i.e., having no user-entered check marks) copy of the document is downloaded in the mobile processing apparatus from a respective database and then reproduced using a printer communicatively coupled to the mobile processing apparatus. Alternatively, using the mobile processing apparatus, a downloaded copy of the document may electronically be forwarded to intended users thereof and printed by the users.

The blank copy of the document is generally provided with markers identifying location and orientation of a portion of the document containing the pre-formatted fields. Alternatively, border lines of some of the pre-formatted fields may be used as such markers. Optionally, the blank copy of the document may also include symbols or codes identifying the document or a particular portion (e.g., page) thereof.

In the document, the check marks may be entered by hand ("handwritten" check marks entered using pens, pencils or other writing instruments) or by using a stamping device or a printer. Such check marks may be of arbitrary, same or different, shapes or form factors.

Generally, density (i.e., contrast) of traces of the user-entered check marks should be sufficient for their observation by a naked eye. However, in some applications, the check marks may be produced using writing instruments leaving traces which, when illuminated using conventional light sources or by sunlight, are invisible to a naked eye, but visible to sensors of a digital camera associated with the mobile processing apparatus.

Referring to FIG. 2, the exemplary document 200 includes an identifier or an ID field 210, markers 220, and a plurality of text blocks 230, some of which have corresponding pre-formatted fields 232 for entering check marks 234. Generally, the document 200 may be a single-page article (as shown) or a multi-page article.

Illustratively, the depicted pre-formatted fields 232 are rectangular regions separated using solid border lines. Those skilled in the art will readily appreciate that pre-formatted fields may have different geometrical properties or be provided with other means of separation from other elements of the text blocks 230.

The identifier 210 (e.g., barcode (as shown), Quick Response (QR) code, etc.) may be used to identify or label the document 200 or a particular page thereof. Alternatively or additionally, separate symbols 210 may be used to identify particular pages in a multi-page document 200.

The markers 220 identify location and orientation of portions of the document containing the pre-formatted fields 232. The markers 220 may have various geometrical patterns (e.g., "+" (as shown), circle, square, and the like, or a combination thereof).

To increase accuracy of identifying regions occupied by the pre-formatted fields 232, the markers 220 are generally disposed at a distance from each other, in different regions of the document 200 (e.g. in at least three corners (as shown)). Alternatively, border lines of three or more pre-formatted fields 232 not located on the same line may be used as the markers 220 (e.g., remotely disposed pre-formatted fields $232_1$ and $232_3$ or $232_7$).

The text blocks 230 generally include one or several lines of text (shown as lines 236, e.g. a question of questionnaire or an item of checklist) or graphical images (not shown).

The pre-formatted fields 232 for entering the check marks 234 may be provided with content-related legends (illustratively, legends "YES" and "NO" are shown). In the document 200, by a way of illustration, the arbitrarily chosen user's check marks 234 are entered in the pre-formatted fields $232_1$-$232_7$.

Each of the steps 120-150 below may be performed using a processor of the mobile processing apparatus or a remote processor communicatively coupled to the mobile processing apparatus. In a preferred embodiment discussed below, steps 120-150 are illustratively performed using computing resources and application programs of the mobile processing apparatus.

At step 120, the mobile processing apparatus analyses the $1^{st}$ file to detect therein digital images of the markers identifying location of the pre-formatted fields and symbols identifying the document or particular pages thereof.

Referring to the document 200, at step 120, a processor of the mobile processing apparatus executes an application program detecting, in the $1^{st}$ file of the document 200, the identifier 210 and markers 220 (or, alternatively, border lines of a selected group of the pre-formatted fields 232, as discussed above in reference to step 110).

At step 130, the mobile processing apparatus executes an application program that uses the $1^{st}$ file to produce a $2^{nd}$ file of the photographed document, in which the 2D digital image of the document is electronically modified to match orientation and size of a digital template thereof. A file containing the digital template of the document may be downloaded from a respective source any time prior to execution of step 130 and then saved in a database of such files of the mobile processing apparatus.

The digital template generally depicts, in a form of a computer code, a scaled (e.g., zoomed up or down) outline image including the markers, ID fields and pre-formatted fields of the photographed document. In one embodiment, such matching (or image registering) is accomplished by matching markers of the 2D digital image contained in the $1^{st}$ file with the respective markers of the digital template of the same document.

Generally, the 2D digital image contained in the $1^{st}$ file is an optically distorted snapshot of the photographed document, and different snapshots of the document(s) may be taken at various angles, distances, or with different zoom settings. Normalizing individual snapshots of the document allows matching of the 2D digital image of the document to the digital template thereof and, in particular, identifying in the 2D digital image of the document locations of the pre-formatted fields for entering the check marks. Normalizing individual snapshots of the document is a pre-processing of the 2D digital image that may include automatic page orientation detection, automatic page cropping, perspective distortions correction, scaling etc.

Figure 3:
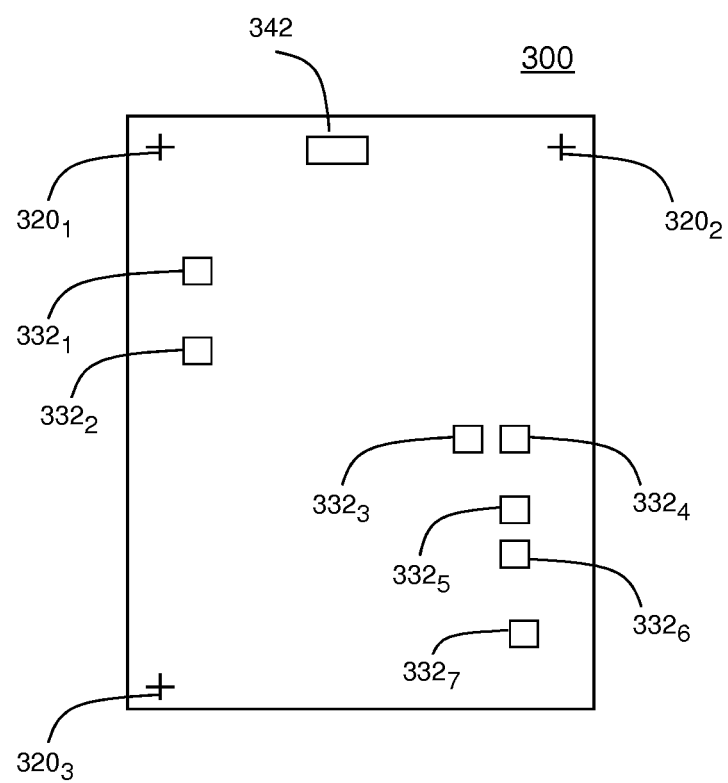
FIG. 3 depicts a graphical image of an exemplary digital template of the document of FIG. 2.

FIG. 3 depicts a graphical image of an exemplary digital template 300 of the document 200 of FIG. 2. In the depicted illustrative embodiment, a graphical image of the digital template 300 is a skeleton of the document 200 that contains graphical images, information about location and the data types of major fields 320, 342 and 332 of the markers 220, ID field 210 and pre-formatted fields 232 thereof, respectively.

Figure 4:
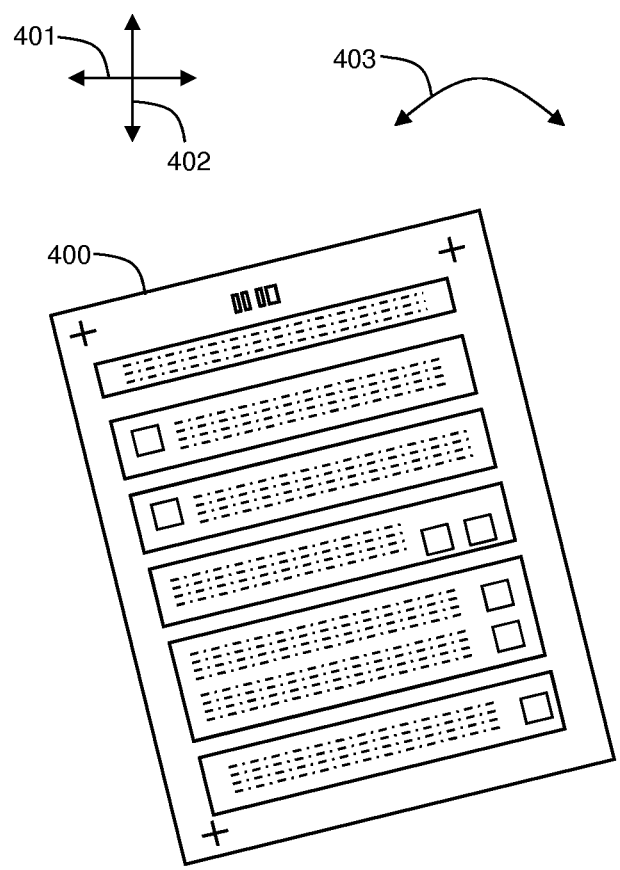
FIG. 4 depicts an illustrative snapshot of the document of FIG. 2 produced using a digital camera associated with the mobile processing apparatus.

FIG. 4 depicts an illustrative snapshot (i.e., graphical image) 400 of the document 200 of FIG. 2 produced using a digital camera associated with the mobile processing apparatus. The image 400 is contained in the $1^{st}$ file and represents a geometrically distorted and off-centered snapshot of the document 200.

For matching to the digital template 300 (discussed above in reference to FIG. 3), the image 400 is electronically modified to provide that the markers 220 of the document 200 coincide with the respective markers 320 of the digital template 300. In one embodiment, at step 130, the image 400 is electronically scaled and turned in the directions of the arrows 401-403. The electronically modified image 400 is saved in the mobile processing apparatus as the $2^{nd}$ file of the document 200.

At step 140, using the digital template as a mask, digitized images of the pre-formatted fields are extracted from the $2^{nd}$ file and selectively saved in a $3^{rd}$ file of the photographed document. Thereafter, to free memory of the mobile processing apparatus, the $2^{nd}$ file of the photographed document may be deleted.

The extracted digitized images contains only snapshots of the pre-formatted fields collectively representing a small fraction of real estate the document and, as such, the $3^{rd}$ file is much smaller (i.e., occupies less memory space) than the $2^{nd}$ file.

Referring to the photographed document 200 and digital template 300 thereof, portions corresponding to the regions 332 of the template 300 are electronically extracted from the $2^{nd}$ file of the document 200. Graphically, the extracted portions correspond to regions of the pre-formatted fields 232 of the document 200. The extracted portions are selectively saved in the $3^{rd}$ file of the document 200, after which the much larger $2^{nd}$ file of the document 200 may be deleted.

At step 150, the digitized images of the pre-formatted fields of the photographed document are derived from the $3^{rd}$ file of the document and electronically analyzed for presence therein of the user-entered check marks.

In one embodiment, a total number $N_1$ of pixel in a digitized image of a pre-formatted field and a number $N_2$ of background pixels thereof are calculated. Then, the number $N_2$ is subtracted from the number $N_1$. When a number of remaining pixels exceeds a first pre-selected threshold, a check mark is considered to be detected in the pre-formatted field.

In another embodiment, a ratio $R=(N_1-N_2)/N_1$ is calculated. When a numeric value of the ratio R exceeds a second pre-selected threshold, a check mark is considered to be detected in the pre-formatted field.

Figure 5:
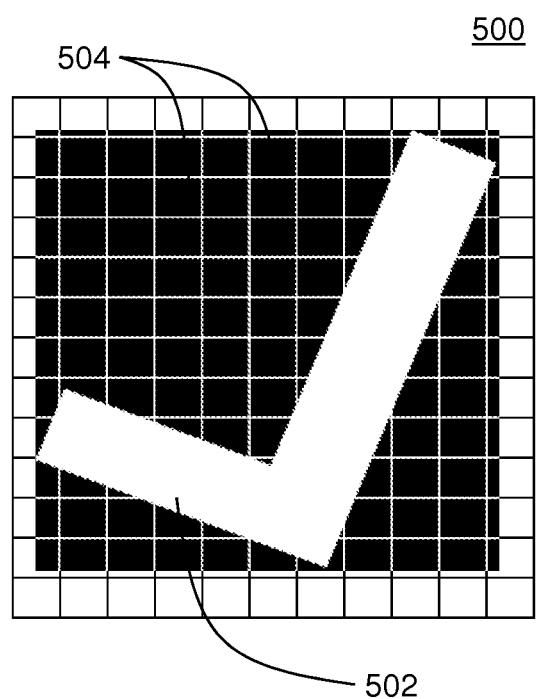
FIG. 5 depicts a digitized image of an exemplary user-marked pre-formatted field of the document of FIG. 2.

FIG. 5 depicts a digitized image 500 of an exemplary user-marked pre-formatted field 232 of the document 200. The image 500 is derived from the $3^{rd}$ file of the document and, illustratively, includes a digitized image of a user-entered check mark 502 (shown, e.g., in the pre-formatted fields $232_1$, $232_3$, and $232_6$ in FIG. 2).

The image 500 includes a plurality $N_1$ of pixels, wherein there are $N_2$ background (clear) pixels 504 and the remaining $N_1-N_2$ pixels are non-background (i.e., at least partially darkened) pixels which, collectively, form a digital image of the user-entered check mark 502.

Results of accumulation and counting the detected check marks from the plurality of documents may be shown on a display of the mobile processing apparatus or saved therein or remotely for further analysis (e.g., statistical analysis) or reference. Additionally, the mobile processing apparatus may provide various error/diagnostic messages (presence of contradicting check marks, absence of required check marks, image-processing or image recognition/identification errors, etc.).

In further embodiments, a plurality of documents having pre-formatted fields for entering the user's check marks may be photographed before their digital images are at least partially processed for presence of the check marks. Alternatively, portions of such analysis may be performed in the mobile processing apparatus as a background data processing routine thereof.

Upon completion of step 150, the method 100 ends at step 152.

Figure 6:
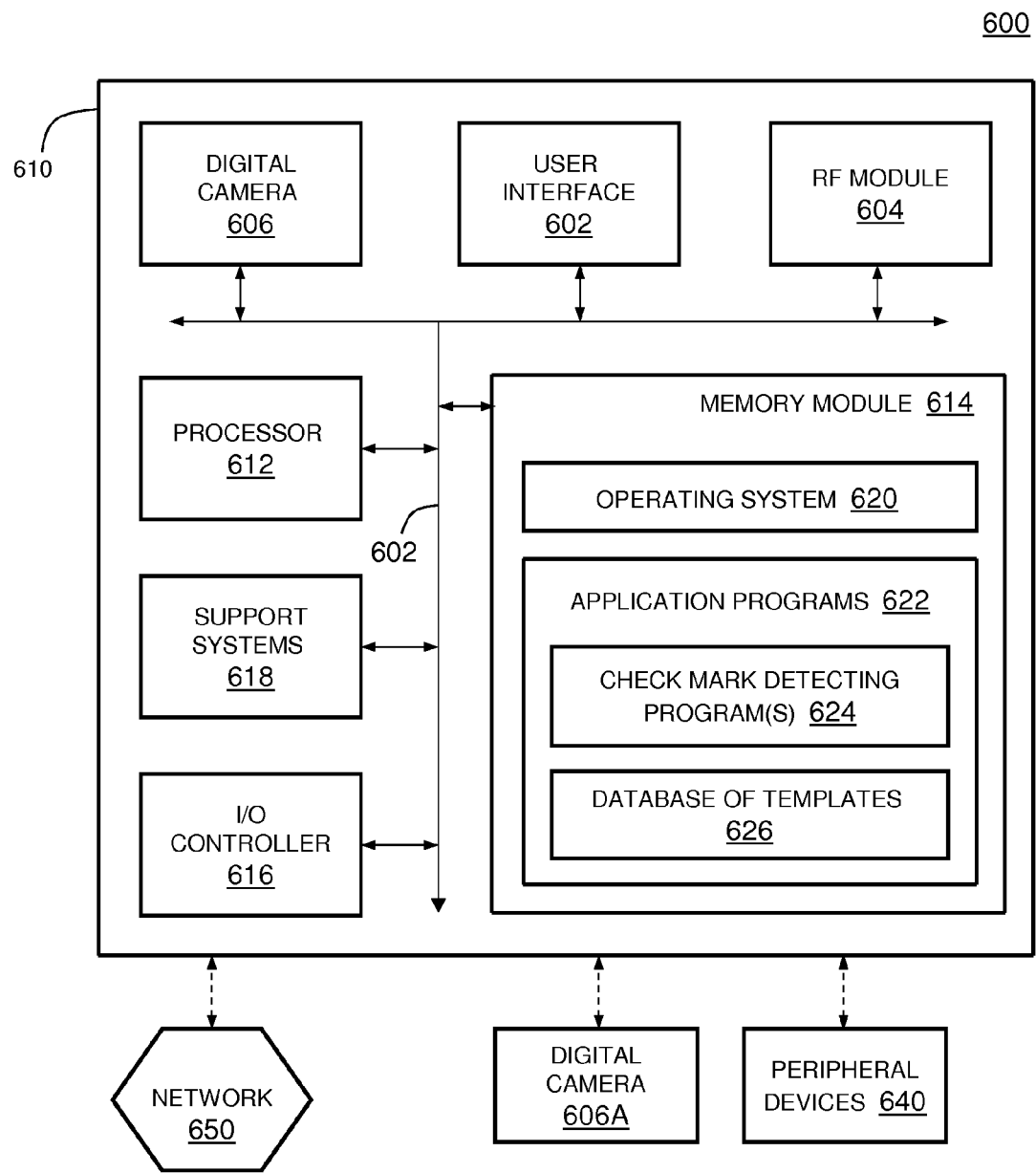
FIG. 6 depicts an exemplary platform utilizing the method of FIG. 1 according to one embodiment of the present disclosure.

FIG. 6 depicts an exemplary platform 600 utilizing the method 100 of FIG. 1 according to one embodiment of the present disclosure. Those of ordinary skills in the art will appreciate that hardware and software configurations depicted in FIG. 6 may vary without departure from the spirit or scope of the disclosure.

The platform 600 generally includes a mobile processing apparatus 610, optional peripheral devices 640 (e.g., displays, printers, etc.) and an optional external/remote digital camera 606A. In some embodiments (as shown), platform 600 is also connected to a network 650 (e.g., Intranet, local/wide area network (LAN/WAN), or the Internet). The apparatus 610 may be implemented, e.g., as a mobile digital phone, an Internet-enabled digital camera, a PDA, or a general purpose/specialized tablet or mobile computer.

When implemented as a mobile digital phone, the apparatus 610 generally includes a user interface (e.g., touch screen) 602, an RF module 604, a digital camera 606, a processor 612, a memory module 614, support systems 618, a system interface 602, and an input/output (I/O) controller 616 providing connectivity to the peripheral devices 640 and network 650. Components of the apparatus 610 may be implemented as hardware devices, software modules, firmware, or a combination thereof. Alternatively or additionally, such apparatus 610 may be associated with (i.e., communicatively coupled to) the external/remote digital camera 606A (e.g., high-resolution digital camera).

In the depicted embodiment, the memory module 614 stores an operating system (OS) 620 and application programs (i.e., computer program products) 622. In alternate embodiments, at least portions of the OS 620 and application programs 622 may reside in a remote computing device (e.g., server of the network 650) communicatively coupled to the apparatus 610.

In the apparatus 610, the application programs 622 include a check mark detecting program(s) 624 and an optional database 626 of digital templates of the processed documents. Among processor-readable instructions provided by the program(s) 624 are the instructions which, in response to their execution, cause the apparatus 610 to perform: (i) producing, using a digital camera associated with the apparatus, a first electronic file containing a 2D digitized image of a document having pre-formatted fields for entering the check marks, and (ii) using the apparatus or a remote processor for: (a) in the first file, detecting symbols identifying the document and markers identifying location and orientation of portions containing the pre-formatted fields, (b) producing a second file wherein the 2D digitized image is modified to match orientation and size of a digital template of the document, (c) using the digital template for electronically extracting from the second file digitized images of the pre-formatted fields, and (d) detecting the check marks in the pre-formatted fields based on quantity therein of non-background pixels.

Other processor-readable instructions provided by the program(s) 624 further specify functions and features discussed above in reference to the method 100. Optionally or additionally, the processor-readable instructions also provide users of the apparatus 610 with access to resources of a computer network or a cloud computing architecture.

Aspects of the present disclosure have been described above with respect to techniques for using a mobile processing apparatus for processing users' check marks in documents having pre-formatted fields for entering the check marks. However, it has been contemplated that portions of this disclosure may, alternatively or additionally, be implemented as separate program products or elements of other program products. All statements reciting principles, aspects, and embodiments of the disclosure and specific examples thereof are also intended to encompass both structural and functional equivalents of the disclosure.

It will be apparent to those skilled in the art that various modifications can be made in the devices, methods, and program products of the present disclosure without departing from the spirit or scope of the disclosure. Thus, it is intended that the present disclosure includes modifications that are within the scope thereof and equivalents.

What is claimed is:

1. A method of using a mobile processing apparatus to process check marks in a document having pre-formatted fields for entering the check marks, the method comprising:
using a digital camera associated with the apparatus to produce a first electronic file containing a 2D digitized image of the document; and
using the apparatus for:
(a) in the first file, detecting identifiers of the document and markers identifying location and orientation of portions containing the pre-formatted fields;
(b) producing a second file wherein the 2D digitized image is modified to match a digital template of the document;
(c) using the digital template for electronically extracting digitized images of the pre-formatted fields from the second file; and
(d) detecting presence of the check marks in the digitized images of the pre-formatted fields based on analysis therein of non-background pixels.

2. The method of claim 1, wherein: the apparatus is a mobile phone, a mobile computing device, or a digital camera.

3. The method of claim 1, wherein: the document is a form, a checklist, a questionnaire, or a plurality thereof; and the document is a single-page article or a multi-page article which pages are provided with selective identifiers.

4. The method of claim 1, further comprising: using as the markers (i) pre-selected graphical symbols or graphical images, or (ii) at least a portion of the pre-formatted fields.

5. The method of claim 1, wherein the step (b) further comprises one or more of: electronically cropping, determining page orientation, correcting perspective distortions and scaling the 2D digitized image of the document.

6. The method of claim 1, wherein the step (c) further comprises: deleting the second file.

7. The method of claim 1, wherein the step (d) further comprises: in the extracted digitized images (i) subtracting background pixels and determining if a number of remaining pixels exceeds a first pre-selected threshold, or (ii) determining if a ratio of non-background pixels to all pixels exceeds a second pre-selected threshold.

8. The method of claim 1, wherein the step (d) further comprises: using the apparatus for saving, in a pre-selected format, results of detecting the detected check marks.

9. The method of claim 1 further comprising performing steps (a)-(d) for a plurality of documents having pre-formatted fields for entering the check marks.

10. The method of claim 9 further comprising accumulating data based on the check marks detected in the plurality of documents, in a pre-selected format; and analyzing the accumulated data.

11. The method of claim 1, wherein the apparatus are coupled to resources of a computer network or a cloud computing architecture.

12. A platform for processing check marks in a document having pre-formatted fields for entering the check marks, the platform comprising:
a mobile processing apparatus associated with a digital camera adapted to produce a first file containing a 2D digitized image of the document; and
a local processor provided with hardware or software resources configured to perform:
(a) in the first file, detecting identifiers of the document and markers identifying location and orientation of portions containing the pre-formatted fields;
(b) producing a second file wherein the 2D digitized image is modified to match a digital template of the document;
(c) using the digital template for electronically extracting digitized images of the pre-formatted fields from the second file; and
(d) detecting presence of the check marks in the digitized images of the pre-formatted fields based on analysis therein of non-background pixels.

13. The platform of claim 12, wherein: the apparatus is a mobile phone, a mobile computing device, or a digital camera;
the document is a form, a checklist, a questionnaire, or a plurality thereof;
the document is a single-page article or a multi-page article which pages are provided with selective identifiers;
the check marks are handwritten, stamped or printed check marks; and
results of detecting the check marks are saved, in a pre-selected format, using the apparatus.

14. The platform of claim 12, wherein (i) the markers are pre-selected graphical symbols or graphical images, or (ii) at least a portion of the pre-formatted fields is used as the markers.

15. The platform of claim 12, wherein the local is configured for one or more of electronically cropping, determining page orientation, correcting perspective distortions and scaling the 2D digitized image of the document.

16. The platform of claim 12, wherein the apparatus are coupled to resources of a computer network or a cloud computing architecture.

17. A non-transitory medium storing processor-readable instructions for processing check marks in a document having pre-formatted fields for entering the check marks, the instructions which, responsive to execution in a mobile processing apparatus associated with a digital camera, cause the apparatus to perform:
using the camera to produce a first file containing a 2D digitized image of the document; and
selectively using the apparatus for:
(a) in the first file, detecting identifiers of the document and markers identifying location and orientation of portions containing the pre-formatted fields;
(b) producing a second file wherein the 2D digitized image is modified to match a digital template of the document;
(c) using the digital template for electronically extracting digitized images of the pre-formatted fields from the second file; and
(d) detecting presence of the check marks in the digitized images of the pre-formatted fields based on analysis therein of non-background pixels.

18. The non-transitory medium of claim 17, wherein the instructions further cause: using as the markers (i) pre-selected graphical symbols or graphical images, or (ii) at least a portion of the pre-formatted fields.

19. The non-transitory medium of claim 17, wherein the instructions for the step (b) further cause one or more of: electronically cropping, determining page orientation, correcting perspective distortions and scaling the 2D digitized image of the document.

20. The non-transitory medium of claim 17, wherein the instructions for the step (c) further cause: deleting the second file.

21. The non-transitory medium of claim 17, wherein the instructions for the step (d) further cause: in the extracted digitized images (i) subtracting background pixels and determining if a number of remaining pixels exceeds a first pre-selected threshold, or (ii) determining if a ratio of non-background pixels to all pixels exceeds a second pre-selected threshold.

22. The non-transitory medium of claim 17, wherein the instructions for the step (d) further cause: using the apparatus for saving, in a pre-selected format, results of detecting the detected check marks.

* * * * *